United States Patent [19]

Shimano

[11] 4,433,963
[45] Feb. 28, 1984

[54] CHAIN GUIDE FOR A DERAILLEUR FOR A BICYCLE

[75] Inventor: Keizo Shimano, Sakai, Japan

[73] Assignee: Shimano Industrial Company Limited, Osaka, Japan

[21] Appl. No.: 218,803

[22] Filed: Dec. 22, 1980

[30] Foreign Application Priority Data

Dec. 29, 1979 [JP] Japan .......................... 54-184225[U]

[51] Int. Cl.³ .......................... F16H 7/22; F16H 11/08
[52] U.S. Cl. .......................... 474/80; 474/94; 474/134
[58] Field of Search .......................... 474/80, 82, 94, 134, 474/165, 198

[56] References Cited

U.S. PATENT DOCUMENTS

| 3,257,860 | 6/1966 | Runde | 474/94 |
| 3,402,942 | 9/1968 | Shamane | 474/134 |
| 3,599,503 | 10/1969 | Schultz | 474/94 |
| 3,990,136 | 11/1976 | Hishida | 474/165 |
| 4,198,874 | 4/1980 | Nagano | 474/134 |
| 4,226,131 | 10/1980 | Yamasaki | 474/134 |

FOREIGN PATENT DOCUMENTS

| 564688 | 2/1958 | Belgium . | |
| 2964 | 11/1979 | European Pat. Off. . | |
| 18842 | 11/1980 | European Pat. Off. | 474/82 |
| 1021893 | 2/1953 | France | 474/80 |
| 1064020 | 5/1954 | France . | |
| 61034 | 3/1955 | France . | |
| 2047359 | 11/1980 | United Kingdom . | |

Primary Examiner—Henry E. Raduazo
Attorney, Agent, or Firm—Stevens, Davis, Miller & Mosher

[57] ABSTRACT

A chain guide for a derailleur for a bicycle, which switches a driving chain to one of multi-stage sprockets and has pulleys meshing with the chain and guiding it to a desired one of the multi-stage sprockets, the pulleys each being divided into a pulley toothed member having a number of teeth and a pulley body having a shaft bore, the pulley body being formed of an elastic material.

4 Claims, 3 Drawing Figures

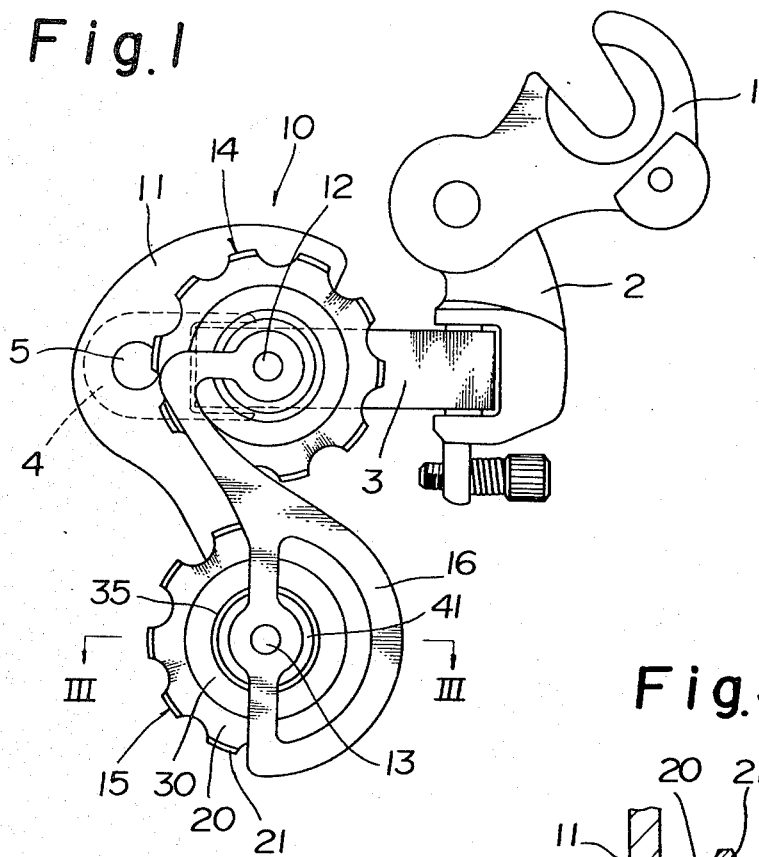
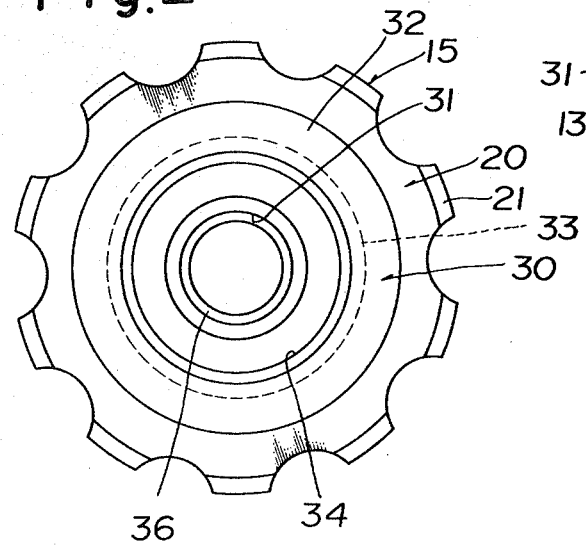
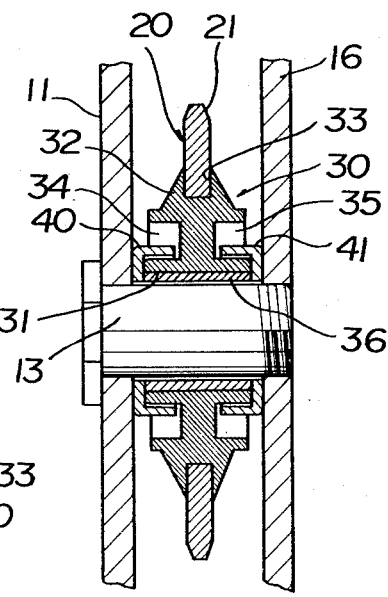

CHAIN GUIDE FOR A DERAILLEUR FOR A BICYCLE

FIELD OF THE INVENTION

This invention relates to a chain guide for a derailleur for a bicycle, and more particularly to a chain guide for a derailleur, which is supported to a movable member at the derailleur and moves together with the movable member axially of multi-stage sprockets mounted on the bicycle, so that a driving chain is guided by the chain guide for switching to one of the multi-stage sprockets.

BACKGROUND OF THE INVENTION

Conventionally, a well-known chain guide for a derailleur comprises a pulley plate, pulley shafts fixed to the pulley plate, and pulleys supported rotatably to the pulley shafts respectively. The pulleys each are usually formed in one piece of a metallic material, such as aluminum alloy, or a wear resistant synthetic resin. The pulley plate is supported to a movable member of the derailleur and moves together with the movable member axially with respect to the multi-stage sprockets. A driving chain, which is guided by the pulleys supported to the pulley plate, is switched to one of the multi-stage sprockets. The pulleys, when the chain is switched, move axially of the multi-stage sprockets with respect to the chain through the movable member and pulley plate, whereby teeth of the pulleys contact with link plates of the chain. As a result, a biasing force acts on the pulleys axially thereof, so that a problem is created wherein the pulleys each are subjected to resistance against their rotation making it difficult to rotate smoothly.

The chain, when switched to one of the multi-stage sprockets, changes in its chain line following selection of the sprocket to mesh with the chain, so that the chain, even after switching, interferes at its link plates with teeth of the pulleys. Occasionally, the pulleys are affected by the axial biasing force so as to be subject to resistance against the pulley's smooth rotation.

The pulley's lack of smooth rotation as foregoing causes poor speed control and applies a load against the bicycle's running, so that a cyclist cannot easily drive the bicycle.

SUMMARY OF THE INVENTION

An object of the invention is to provide a chain guide which can restrict to a minimum a rotational resistance applied to each pulley by the axial biasing force acting thereon due to interference of the chain's link plate with teeth of the pulley when the chain is switched or the chain line changes.

In detail, the chain guide of the invention has the pulleys each divided into a toothed member and a pulley body formed of an elastic material, so that, when the toothed member interferes with link plates of the chain, the pulley body is elastically deformed to displace the toothed member axially of a pulley shaft, thereby restricting to a minimum a rotational resistance applied to the pulley, thus enabling the pulley to smoothly freely rotate.

These and other objects of the invention will become more apparent in the detailed description which follows and the accompanying drawings.

BRIEF DESCRIPTION OF THE DRAWINGS

FIG. 1 is a rear view of a rear derailleur employing a chain guide of the invention, FIG. 2 is an enlarged front view of a pulley only, and FIG. 3 is an enlarged sectional view taken on the line III—III in FIG. 1.

DETAILED DESCRIPTION OF THE INVENTION

Referring to FIG. 1, a chain guide 10 is applied to a usual derailleur which comprises a bracket 1 fixed to the bicycle frame, a base member 2 mounted on the bracket 1, a pair of linkage members 3 supported to the base member 2, and a movable member 4 supported to the linkage members 3. The chain guide 10 is supported to the movable member 4 through a pivot pin 5. A control wire is attached at its one end to one linkge member 3 or movable member 4 and operated to move the movable member 4 axially of multi-stage sprockets (not shown) mounted on the bicycle, so that a driving chain (not shown) is guided by the chain guide 10 to be switched to a desired one of the sprockets, thereby changing the bicycle speed. The chain guide 10 basically comprises a pulley plate 11 supported to the movable member 4, pulley shafts 12 and 13 fixed to the pulley plate 11, and pulleys 14 and 15 supported rotatably to the pulley shafts 12 and 13 respectively.

One pulley 14 is generally called a guide pulley and the other 15 a tension pulley. The guide pulley 14 guides the driving chain to a desired one of the multi-stage sprockets, and the tension pulley 15 gives constant tension to the chain through a tension spring (not shown), which is interposed between the pulley plate 11 and the movable member 4 and functions to apply tension to the chain guided to the tension pulley 15. In addition, in FIG. 1, reference numeral 16 designates a guard plate mounted on the utmost end of the respective pulley shafts 12 and 13 and disposed opposite to the pulley plate 11, the guard plate 16 preventing the chain from escaping from the respective pulleys 14 and 15.

The chain guide of the invention has the pulleys 14 and 15 constructed as follows:

For the convenience of description, one pulley 15 only will be described because pulleys 14 and 15 are the same in construction.

The pulley 15, as shown in FIGS. 2 and 3, comprises an annular toothed member 20 provided at its outer periphery with a number of teeth 21, and a pulley body 30 which has at the center thereof a shaft bore 31 fitted onto the pulley shaft 13 and at the outer periphery a support portion 32 for the toothed member 20. The toothed member 20 is formed of a metallic material, such as aluminum or its alloy or iron, or a hard material, such as a hard wear resistant synthetic resin. The pulley body 30 is formed of an elastic material, such as rubber or soft synthetic resin, preferably soft rubber, which is oil and wear-resistant.

The toothed member 20 shown in the drawings is formed of an iron plate of a certain thickness. The pulley body 30 is formed of hard rubber and provided at its outer peripheral support portion 32 with a fitting groove 33 of width substantially equal to the thickness of the toothed member 20, so that the toothed member 20 is fitted at its inner periphery into the groove 33, thereby being coupled with the pulley body 30.

The opposite walls of groove 33 are elastically deformed to fit therein the toothed member 20, or the toothed member 20 is previously inserted into the groove 33 and then integrated with the pulley body 30.

The pulley body 30 is provided at both axial sides thereof with annular recesses 34 and 35, thereby being properly elastically deformable. Caps 40 and 41, as shown in FIG. 3, are fitted onto the pulley body 30 so as to seal a gap between the shaft bore 31 and the pulley shaft 13, the gap usually being filled with grease. The pulley body 30 shown in FIG. 3, has a metallic bushing 36 inserted into the shaft bore 31 to thereby enable the pulley 15 to smoothly rotate.

When the derailleur is operated to move the movable member 4 axially of the multi-stage sprockets to switch the chain to a desired sprocket, the chain guide 10 carried by the movable member 4 moves together therewith, so that the pulleys 14 and 15 which mesh with the chain and guide it, interfere at the teeth with link plates of the chain, thereby being subjected to the biasing force axially acting on the pulleys 14 and 15.

When subjected to the axial biasing force, the toothed member 20 separate from the pulley body 30 is axially displaced therethrough, whereby the biasing force is absorbed by the pulley body 30 of elastic material and is not transmitted to the shaft bore 31. Hence, the pulley shafts 12 and 13 are subjected to no rotational resistance in spite of deformation of the pulley body 30, thereby being smoothly rotatable.

In a case that the chain, after being switched to a desired sprocket, is displaced on its chain line between the front sprocket and one of the multi-stage sprockets meshing with the chain, the pulleys 14 and 15 are subjected to the axially biasing force. In this instance, the toothed member 20 is displaced, similarly to the former case, in the same direction of the displaced chain line, thereby enabling smooth rotations of the pulleys 14 and 15.

As seen from the above, the chain guide of the invention, even when an axial load is applied to the respective pulleys 14 and 15, allows the toothed member 20 to be displaced and the pulley body 30 to absorb the load, thereby always smoothly rotating the pulleys to enable easy driving of the bicycle.

Furthermore, the pulley body 30 can restrict noise generated by engagement of the respective pulleys 14 and 15 with the chain.

While the form of embodiment of the invention as herein disclosed constitutes a preferred form, it is to be understood that other forms might be adopted, all coming within the scope of the claims which follow.

What is claimed is:

1. A chain guide for a speed changing derailleur for a bicycle, said chain guide comprising a pulley plate, pulley shafts fixed to said plate, and pulleys supported rotatably to each of said pulley shafts respectively, said pulleys each being provided with an annular pulley toothed member having at its outer periphery a number of teeth and a pulley body having at a central portion thereof a shaft bore fitted onto a said pulley shaft and at the outer periphery a support portion for said tooth member, said pulley toothed member being formed of a wear resistant material, said pulley body being formed of an elastic material and having opposing annular recesses on each side thereof which define between them a portion of said body which has a reduced thickness, said recesses facilitating elastic deformation of said body, said pulley toothed member being coupled with said support portion at said pulley body, whereby said pulley body is elastically deformable enabling said pulley tooth member to be displaceable axially of said pulley shaft and freely rotatable during and after a speed changing movement of said chain guide.

2. A chain guide for a derailleur for a bicycle according to claim 1, wherein caps are fitted onto said annular recesses.

3. A chain guide for a derailleur for a bicycle according to claim 1, wherein said pulley toothed member is formed of a plate of a certain thickness, and at said support portion of said pulley body is provided a fitting groove having a width substantially equal to the thickness of said toothed member, so that said toothed member is fitted into said fitting groove for coupling with said pulley body.

4. A chain guide for a derailleur for a bicycle according to claim 1, wherein a bushing is mounted on the central portion of said pulley body.

* * * * *